(No Model.)

S. O. RICHARDSON, Jr.
GLASS BLOWING MACHINE.

No. 570,881.

3 Sheets—Sheet 1.

Patented Nov. 3, 1896.

WITNESSES:
David C. Walter
L. E. Brown.

INVENTOR
Solon O. Richardson Jr.
BY
Hueau Hall,
ATTORNEY (No Model.) 3 Sheets—Sheet 2.

S. O. RICHARDSON, Jr.
GLASS BLOWING MACHINE.

No. 570,881. Patented Nov. 3, 1896.

(No Model.) 3 Sheets—Sheet 3.
S. O. RICHARDSON, Jr.
GLASS BLOWING MACHINE.
No. 570,881. Patented Nov. 3, 1896.
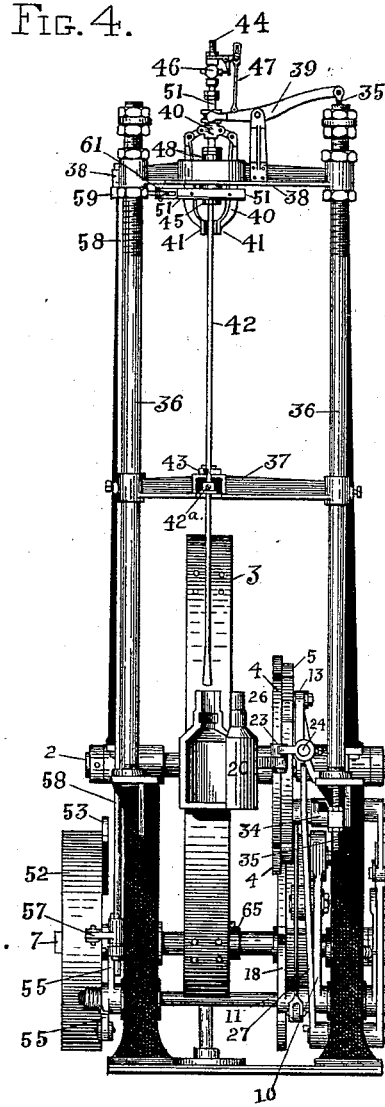
Fig. 4.
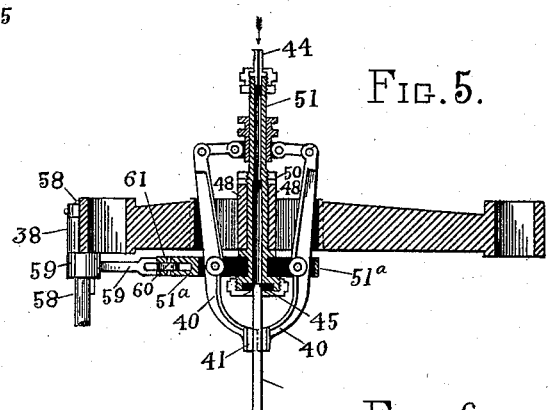
Fig. 5.
Fig. 6.
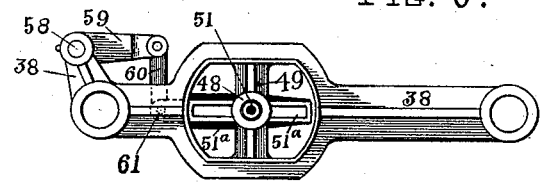
Fig. 7.
Fig. 8.
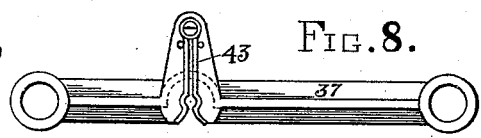
Fig. 9.
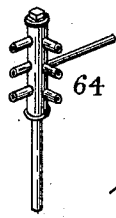
WITNESSES:
David C. Watter
L. E. Bruns.
INVENTOR
Solon O. Richardson Jr.
BY
Husan Hall
ATTORNEY
THE NORRIS PETERS CO., PHOTO-LITHO., WASHINGTON, D. C.

UNITED STATES PATENT OFFICE.

REISSUED

SOLON O. RICHARDSON, JR., OF TOLEDO, OHIO.

GLASS-BLOWING MACHINE.

SPECIFICATION forming part of Letters Patent No. 570,881, dated November 3, 1896.

Application filed April 8, 1895. Serial No. 544,915. (No model.)

*To all whom it may concern:*

Be it known that I, SOLON O. RICHARDSON, Jr., a citizen of the United States, residing at Toledo, Lucas county, Ohio, have invented certain new and useful Improvements in Glass-Blowing Machines, of which the following is a specification.

My invention relates to that class of machines in which glass is blown and expanded within molds; and its objects are to provide means for presenting the molds at the point where the glass is to be blown and there causing said molds to pause during the operation of blowing the glass, thus avoiding the large amount of breakage likely to occur when the glass is blown wholly or in part while the flask is in motion; means for causing said molds to open and close at the proper point in their travel; means for grasping and holding the blowpipe in position while the glass is being blown and imparting to such blowpipe an oscillatory movement during such operation, thereby preventing marks or seams on the finished product of the machine caused by irregularities upon the inner surface of the flasks; means for intermittingly admitting an air-blast through the blowpipe to the interior of the flasks, and means for spraying or steaming the interior of the flasks preparatory to their use. I attain these objects by means of the mechanism and arrangement of parts hereinafter described, and shown and illustrated in the accompanying drawings, made part hereof, in which—

Figure 1:
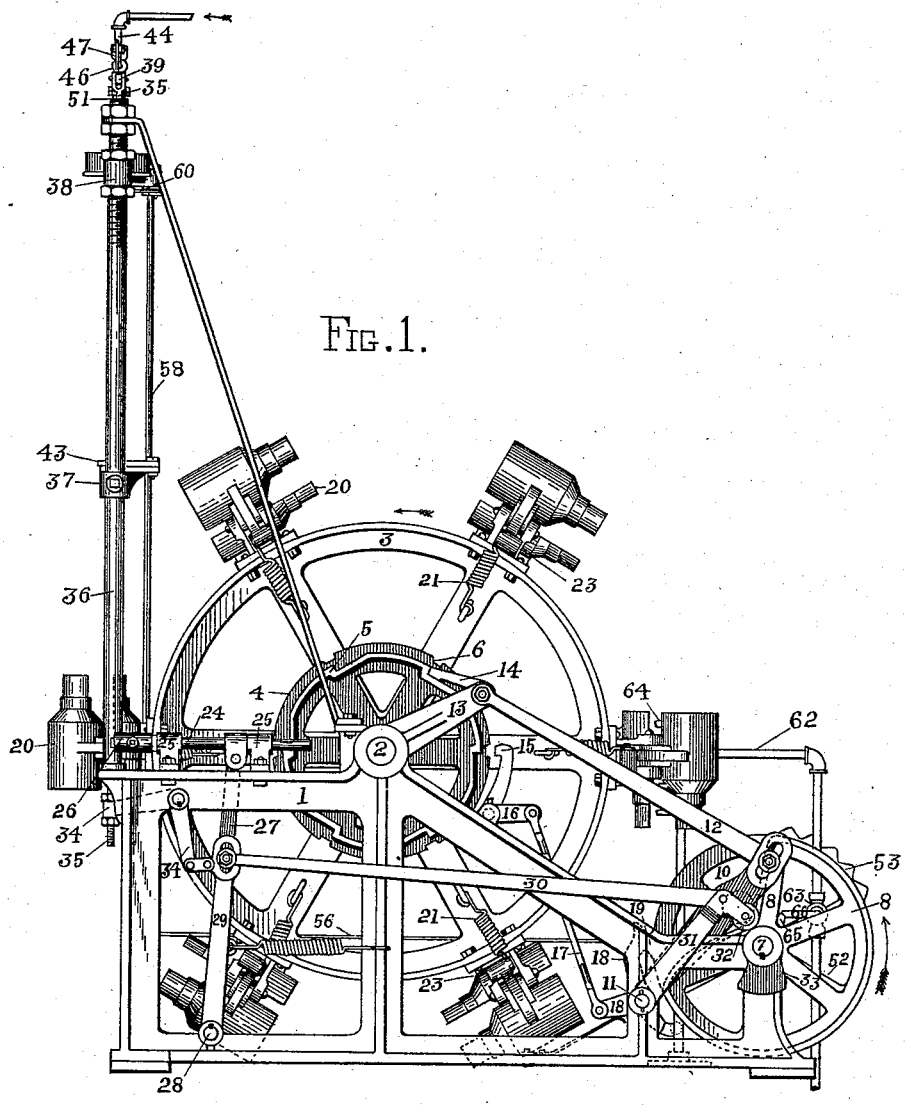
Figure 2:
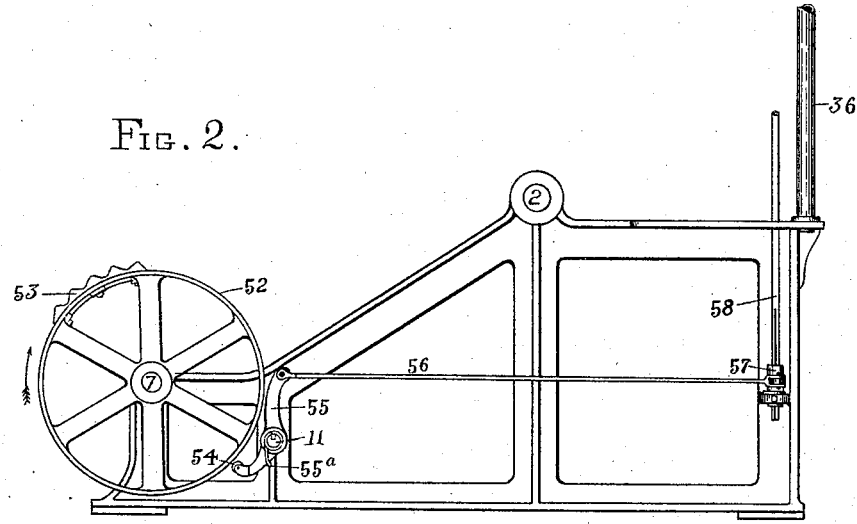
Figure 3:
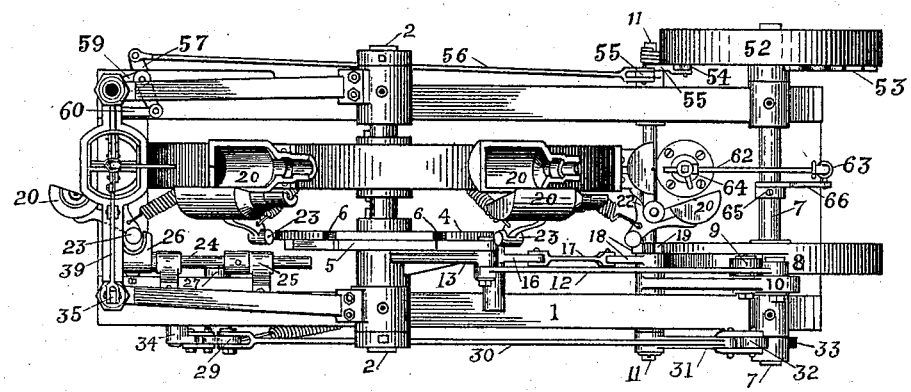

Figure 1 is a side elevation of my machine; Fig. 2, an elevation of the opposite side of said machine, showing a part of the mechanism hereinafter referred to; Fig. 3, a plan view of my machine; Fig. 4, a front end elevation of the same; Fig. 5, an enlarged sectional elevation of the device designed to grasp and oscillate the blowpipe hereinafter referred to; Fig. 6, a plan view of a portion of the same; Fig. 7, a side elevation of a cross-piece and brace hereinafter referred to; Fig. 8, a plan view of the same, and Fig. 9 a perspective view of the spraying or steaming nozzle hereinafter referred to.

Like numerals of reference represent like parts throughout the several views.

In the drawings, 1 is the table or frame of my machine, composed, preferably, of iron, across the top of which is journaled shaft 2, upon which is mounted and secured a stout wheel or frame 3, designed to support and carry the flasks hereinafter referred to. Mounted upon and secured to the same shaft is a ratchet-wheel 4, having ratchet-teeth 5 and stop-teeth 6. At the rear of the table or frame is journaled the driving-shaft 7, upon which is mounted and secured a cam-wheel 8. Riding upon this cam is a cam-roller 9, (see Fig. 3,) which is mounted upon the extremity of arm 10, which is pivoted at its lower end, as at 11, upon the frame of the machine. At its upper end arm 10 is pivotally connected to one end of rod 12, which rod at its other end is pivotally connected to oscillating arm 13, journaled loosely upon the shaft 2. Rod and arm 12 13 carry pawl 14, which engages the teeth of ratchet-wheel 4. Rod 12 is adjustably secured to arm 10, (see Fig. 1,) so that the throw of the pawl attached to rod 12 may be exactly regulated. A dog 15 is pivoted on a stud cast with the frame 1 and is connected, by means of rod 17, to bell-crank 18, which is actuated by cam 19 on the periphery of the cam-wheel 8. This cam-wheel is provided with two cams 8 and 19, one of which cams, 8, through arm 10, pivoted at 11, rod 12, pivoted on arm 13, pawl 14, and ratchet-wheel 4 on shaft 2, rotates the flask-carrying frame step by step, while the other cam, 19, through dog 15 16, rod 17, and bell-crank 18, alternately engages and releases the stop-teeth 6, thus holding the parts mounted on shaft 2 immovable, except when the pawl 14 is driving its ratchet-wheel forward.

Mounted upon and attached securely to the periphery of the wheel or frame 3 at equidistant intervals, and projecting radially therefrom, is a series of flasks or molds 20, each in two halves, which halves are hinged together. One of these halves is rigid on the wheel 3, and the other half is adapted to swing outward upon its hinge or pivot, being held normally open by means of springs 21, attached at one end to the swinging halves of the flasks and at their opposite ends to lugs cast upon the wheel or frame 3. The swinging half of the flask is provided with a stop 22, (see Fig. 3,) limiting the throw of this part and preventing it from opening too far. On each swinging half of flask 20 is a lug 23, which during the pause of the flask in its travel is engaged by push-rod 24, reciprocating in bearings 25, bolted to the top of frame 1. The engagement between the swinging half of the flask and the push-rod is accomplished by means of a jaw 26, secured to the outer extremity of push-rod 24. The opening of jaw 26 is disposed in a horizontal plane, (see Fig. 3,) so that lug 23 on the flask 20 may pass freely through the jaw in a vertical direction, but during the pause of the flask in its travel the lug 23 is partly embraced by the jaw, so that the horizontal movement of the push-rod and its jaw will move the lug 23 in a like manner, thus causing the swinging half of the flask either to open or to close upon the fixed half, as the case may be. The movement of the push-rod which causes the closing and opening of the flask during its pause is accomplished by means of an arm 27, pivotally attached at its upper end to the push-rod, and connected at bottom to one end of a short shaft 28, to the opposite end of which is keyed an arm 29, which may be regarded as an extension or part of arm 27, the upper end of the arm or extension 29 being pivotally connected with rod 30, which is pivotally connected at its rear end with a swinging arm 31, pivoted at its lower end to the frame and carrying at its upper end a cam-roller which is engaged and actuated by cam 33 on driving-shaft 7. The push-rod 24 and its jaw 26 are held in retracted position by a stout spring or equivalent device which may be attached to arm 29 and the frame, as shown in Fig. 1.

That part of my machine designed to grasp and hold the blowpipe in position and to admit air to the blowpipe during the operation of blowing the glass consists of a bell-crank 34, one arm of which is connected with and actuated by the arm 29 above referred to, the other arm being adjustably secured to vertical rod 35, which passes up through the center of one of the upright standards 36. These standards rest upon and are secured to and braced upon the front end of the frame of the machine, and are connected by a vertically-adjustable cross-bar 37 (see Figs. 7 and 8) and a vertically-adjustable head 38. (See Figs. 5 and 6.) Rod 35 at top is connected to one end of lever 39, the other end of the lever engaging the toggle-head of the two-armed clutch 40, having jaws 41, which, when the outer end of lever 39 is thrown upward by the rod 35, firmly clasp and hold in place the upper end of the blowpipe 42. The blowpipe is also engaged and held in vertical alinement by means of a spring-clip 43 on cross-piece 37. (See Figs. 7 and 8.) The blowpipe is provided with a collar 42$^a$, which, when the blowpipe is in place, rests upon the lower horizontal flange of the cross-piece 37. An air-pipe 44 leads into and terminates in a socket 45, which is faced with india-rubber and is designed to receive the upper end of the blowpipe. In the air-pipe is a cock or valve 46, which is controlled by a rod 47, connected with lever 39 and the stem of valve 46, as shown in Fig. 4.

Cross-head 38 is cast with an opening in the center of which is a sleeve 48, supported by a web or cross-bar 49, the sleeve and cross-bar being cast integral with the cross-head 38. A nut and jam-nut 50 are screwed upon a hollow spindle 51, which passes up through sleeve 48 and which is connected at its upper end with the air-pipe in such manner that the spindle may be rotated independently of the air-pipe, the nuts 50 forming a support and bearing for the spindle upon sleeve 48. The spindle 51 at its lower end is provided with a bar 51$^a$, cast integral therewith, having a vertical opening therethrough, in which the two arms of the clutch 40 are pivoted. (See Figs. 5 and 6.) It will be seen that the spindle connected with the air-pipe and carrying the clutch 40 is suspended from the central web and collar of the cross-head 38 by means of the nuts 50 in such manner that these parts may be oscillated horizontally independently of the cross-head. This oscillation of the blowpipe-clasping device and the air-inlet thereto is accomplished in the following manner: Attached to the rim of the driving-pulley 52 on shaft 7 (see Fig. 2) is a sinuous or zigzag sector 53, which engages in its revolution a cam-roller 54 on lever 55, which is held in operative position by spring 55$^a$, (see Fig. 2,) and which is connected by a horizontal connecting-rod 56 with arm 57, fixed to vertical shaft 58, which is journaled at bottom on a lug cast with the frame of the machine and at top in an arm cast with cross-head 38. The vertical shaft 58 has keyed thereto, near its upper end, an arm 59, which by means of link 60 is pivotally connected, as at 61, with the bar 51$^a$, forming part of spindle 50. It will be seen that when the zigzag sector 53 on the driving-pulley engages lever 55 it will cause said lever to oscillate on its fulcrum, giving a like motion to the blowpipe-clamp through connections 56, 57, 58, 59, and 60.

At the rear of the machine is a pipe 62, through which a jet or spray of steam or water may be discharged into the open flasks for the purpose of moistening and cooling the same. Pipe 62 is provided with a cock 63 and one or more spraying-nozzles 64. (See Fig. 9.) A cam or arm 65 on the driving-shaft in its revolution and at the proper instant engages and throws the lever or handle 66 of valve or cock 63.

By placing the wheel or frame 3 in a vertical position in contradistinction to a horizontal one the machine occupies much less floor-room, the parts are compactly arranged, the flasks are free to fly open, as soon as the article is ready to be removed, so as to cool, or they can be separately cooled or moistened by the application of steam or water, and many other advantages are gained.

Having enumerated the parts of my device and their arrangement, I will proceed to describe the operation of my machine.

The driving-shaft 7 being in motion, cam 8, through roller 9, arm 10, connecting-rod 12, and pawl 13, rotates the wheel or frame 3 one step, bringing the flask at the front of the machine in horizontal position with its mouth upward. At the same instant the dog 15 is caused by its cam and connections to engage the stop-tooth 6 on ratchet-wheel 4, thus, for the moment, holding the wheel and its flasks against accidental motion. The attendant, having the molten glass gathered upon the lower end of the blowpipe in the usual way, now inserts the upper end of the blowpipe into the socket 45 and pushes the pipe sidewise into spring-clip 43 on cross-piece 37. In this position the lug 23 upon the arm of the swinging half of the flask in question is embraced by the jaw 26 on push-rod 24, which by means of its cam 33 and intermediate connections now causes the hinged part of the flask to close tightly against the other half of the flask. The molten glass which hangs as an elongated drop or bulb from the lower end of the blowpipe is now suspended within the upturned mouth of the flask. At this instant the same motion of cam 33 which has closed the flask also throws bell-crank 34 and vertical rod 35, thus actuating the blowpipe-clamping mechanism above described, and, simultaneously, by means of lever 39 and rod 47, admits compressed air into the blowpipe through cock or valve 46.

In order to impart a smooth surface to the finished glass article, the zigzag or sinuous sector 53 on the driving-pulley 52 now, through its connections with plate or bar 51ª above described, causes the blowpipe and its clamping mechanism and the spindle through which the compressed air is admitted and upon which the clamping mechanism is suspended to oscillate horizontally while the operation of blowing continues.

The blowing of the article being completed, cam 33 now permits the push-rod 24, with its jaw 25, to be retracted by means of the pull of the spring or weight above referred to, thus opening the flask and permitting the attendant to withdraw the blowpipe with the blown article suspended therefrom, and at the same time, by the reverse motion of lever 34, rod 35, and lever 39, opening the blowpipe-clamp and shutting off the air at cock 46. At the instant of the opening of the flask the zigzag sector 53 is disengaged from the lever 54, and the motion of this lever and the mechanism connected therewith ceases. During the pause of the flask-carrying wheel 3 an open inverted flask has been presented in close proximity to the spray or jet of nozzle 64, to which steam or water has been admitted through the action of arm or cam 66 upon the stem or handle of valve 63. While the operations above described have been taking place, pawl 14 has been traveling backward, carried by its cam and connecting mechanism, so that the pawl has engaged the next succeeding tooth on the ratchet-wheel 4. The parts of the machine now stand ready to repeat the operation here described as the next revolution of the driving-shaft shall bring the various working parts into play.

Having fully described my invention, what I claim, and desire to secure by Letters Patent, is—

1. In a glass-blowing machine, a vertical rotatory wheel or frame and a series of flasks mounted upon the edge thereof, and which are normally open, in combination with means for imparting to such wheel or frame an intermittent motion, whereby said flasks are caused to pause during the operation of blowing glass within said flasks, substantially as and for the purpose specified.

2. In a glass-blowing machine, a rotatory vertical frame or wheel, and a series of flasks mounted on the edge thereof, and which are normally open, in combination with means for imparting an intermittent motion to said frame or wheel, and means for securing said frame or wheel against accidental motion during the pause in its rotation, substantially as and for the purpose specified.

3. In a glass-blowing machine, a rotatory vertical frame or wheel, and a series of flasks mounted on the edge thereof, and which are normally open, and means for imparting an intermittent motion to said frame or wheel, in combination with a blowpipe, and means for admitting air to the blowpipe of said machine during the pause in the rotation of said frame or wheel, substantially as and for the purpose specified.

4. In a glass-blowing machine, a rotatory vertical frame or wheel and a series of flasks mounted on the edge thereof, and which are normally open, and means for imparting an intermittent motion to said frame or wheel, in combination with a rotatory or oscillatory blowpipe, and means for rotating or oscillating the blowpipe of such machine during the pause of said frame or wheel in its rotation, substantially as and for the purpose specified.

5. In a glass-blowing machine, a rotatory vertical frame or wheel, a series of flasks mounted on the edge thereof, and which are normally open and means for imparting an intermittent motion to said frame or wheel, in combination with means for steaming or spraying the flasks of said machine during the pause in the rotation of said frame or wheel, substantially as and for the purpose specified.

6. In a glass-blowing machine, a suitable framework, a rotatory vertical frame or wheel mounted therein, a series of flasks mounted on the edge thereof, and which are normally open; a driving-shaft provided with cams, suitable intermediate devices, operated by the cams, for imparting an intermittent motion to said vertical frame or wheel; and means for opening and closing the flasks; combined with a rotatory blowpipe, and means for imparting thereto a rotary or oscillatory motion; and means for admitting air to the blowpipe at predetermined times, substantially as shown.

7. In a glass-blowing frame, a suitable framework, a vertical rotatory wheel mounted therein, a series of flasks, each formed of two parts, mounted on the edge thereof; a spring applied to the movable part of each flask for opening and holding it open; and a means for closing each flask as it is raised into position, combined with a means for imparting an intermittent rotatory motion to the flask-carrying wheel, and a means for locking the wheel in position at the same time that the flask is closed, substantially as described.

8. In a glass-blowing machine, a frame or table having journaled thereon, a rotatory vertical wheel, a series of flasks mounted on the edge thereof, in combination with a shaft journaled on said frame, and a cam on said shaft connected with and adapted to impart to said frame or wheel an intermittent motion, whereby said flasks are caused to pause during the operation of blowing glass within the flasks, substantially as and for the purpose specified.

9. The cross-head 38, having a longitudinal slot, a rod 35 extending above the cross-head, and a mechanism for giving the rod a vertical movement, combined with the lever 39, connected at one end to the rod 35, a clutch which extends up through the slot in the cross-head and is operated by the lever, and which clutch is provided with jaws to clamp the blowpipe, a blowpipe, a vertical air-pipe, upon which the clutch is suspended, and a suitable mechanism for imparting to the clutch a rotary or reciprocating motion, substantially as shown.

10. In a glass-blowing machine, an air-pipe 44, provided with a cock for controlling the passage of air to the blowpipe, and which is operated by the lever 39, a clutch having its sliding upper portion or head applied to the pipe, and operated by the lever 35, the blowpipe, and means for making a tight connection between the lower end of the air-pipe and the upper end of the blowpipe, combined with the lever 39, for operating the clutch, a vertically-operating rod 35, connected at its upper end with the lever, and a mechanism for imparting to the rod a vertical movement at predetermined times, substantially as described.

11. In a glass-blowing machine, suitable supports or standards, a slotted cross-head connecting the upper ends of the standards, an air-pipe, passing down through the head, a clutch placed upon the pipe, and extending down through the cross-head, a lever connected to the clutch for opening and closing it, and means for operating the lever at predetermined periods, combined with a cock in the air-pipe, and that is operated by the said lever, a spindle which forms an extension upon the end of the air-pipe, and has the bar 51ª connected to its lower end to form a support for the clutch, a partially-revolving rod 58, provided with an arm 59, a connecting-link, and the blowpipe, substantially as set forth.

12. In a glass-blowing machine, a frame or table having journaled thereon a flask-carrying frame or wheel, in combination with a shaft journaled on said frame, and a rotatory blowpipe, combined with a cam on said shaft connected with and adapted to impart to the blowpipe of said machine a rotary or oscillatory motion, substantially as and for the purpose specified.

13. In a glass-blowing machine, a suitable framework, standards rising from one end thereof, a cross-head connecting said standards at a point between their ends, and having a horizontal recess to receive the blowpipe, combined with a spring-holder to support the blowpipe, a rotatory blowpipe, and a suitable mechanism for imparting to the blowpipe a rotatory or reciprocating motion, substantially as shown.

14. In a glass-blowing machine, the frame or table thereof, having standards mounted upon and secured to the front end thereof, in combination with a cross-head connecting said standards near their upper end, and provided with means for controlling the admission of air to the blowpipe of said machine, means for clamping said blowpipe in position, and means for rotating or oscillating said blowpipe, substantially as and for the purpose specified.

15. In a glass-blowing machine, a series of two-part flasks, the two parts of each of said flasks being hinged together, one part of each of said flasks being rigidly secured to a flask-carrying wheel or frame, in combination with stops on said flasks limiting the throw of the swinging parts of said flasks, and lugs on said swinging parts, adapted to be engaged by the flask opening and closing mechanism of said machine, substantially as and for the purpose specified.

16. In a glass-blowing machine, an air-pipe, a rotatory blowpipe connected at one end thereto, a clamp for grasping the upper end of the blowpipe, and an operating mechanism for opening and closing the clamp at regular predetermined times, combined with a suitable mechanism for imparting to the air-pipe, clamp, and blowpipe a rotary or reciprocating motion, substantially as shown.

17. In a glass-blowing machine, a vertically-rotating wheel and a mechanism for imparting thereto an intermittent motion, combined with a series of flasks secured to the edge of the wheel, each flask consisting of two parts which are hinged together, the swinging portion being provided with a stop 22, and lug 23; a spring-actuated push-rod, and a mechanism for operating it at regular predetermined times, a jaw 26, upon the push-rod for engaging with the lug 23, and a spring for opening and holding the flask open, substantially as described.

18. In a glass-blowing machine, a wheel or frame having an intermittent rotary motion, a ratchet-wheel having stop-teeth in its edge; a driving-shaft provided with a cam-wheel 8, a cam-roller 9, riding upon the cam-wheel 8, and a pivoted lever 10, carrying said roller, combined with the rod 12, connected at one end to the lever 10, an oscillating arm 13, pivoted upon the shaft of the wheel, and serving to support the end of the rod 12, the pawl 14, operated by the rod 12; a locking-dog 15, and a mechanism for operating it, so as to lock the wheel just as a flask is presented to the blowpipe, substantially as set forth.

19. In a glass-blowing machine, the driving-shaft 7, provided with a cam 33, the swinging arm 31, operated by the cam, the rod 30, connected at one end to the swinging arm, and the two swinging arms or levers 29 and 27, connected by a short shaft, and operated by the rod 30, combined with a push-rod which is operated by the arm or lever 27; a crank-lever 34, connected to and operated by the arm or lever 29, a vertically-moving rod, operated by the crank-lever, and a clamp operated by said vertically-moving rod, whereby the push-rod and the clamp for the blowpipe are operated at the same time and from the same source, substantially as shown.

20. In a glass-blowing machine, the driving-shaft, the driving-pulley secured thereto, and provided with a zigzag sector, a pivoted spring-actuated lever 55, provided with a roller to engage said sector, and a connecting-rod 56, connected at one end to the lever 55, combined with a partially-revolving rod 58, provided with an arm to which the rod 56 is connected, an arm or crank connected to the upper end of the rod, and a mechanism connected thereto for rotating or reciprocating the blowpipe, substantially as described.

21. In a glass-blowing machine, the driving-shaft, a cam or arm 65 secured thereto, a water or steam pipe provided with a cock 63, that is operated by the cam or arm, and a spraying-nozzle connected to the pipe, combined with a rotating wheel having an intermittent motion, and a series of flasks, which are normally open, secured to its edge, substantially as set forth.

SOLON O. RICHARDSON, JR.

In presence of—
ISAAC N. HUNTSBERGER,
L. E. BROWN.